United States Patent [19]
Demmer

[11] Patent Number: 5,621,478
[45] Date of Patent: Apr. 15, 1997

[54] MULTISTANDARD DECODER FOR VIDEO SIGNALS AND VIDEO SIGNAL DECODING METHOD

[75] Inventor: Walter Demmer, Nuremberg, Germany

[73] Assignee: Harris Corporation, Melbourne, Fla.

[21] Appl. No.: 497,008

[22] Filed: Jun. 30, 1995

[30] Foreign Application Priority Data

Jul. 1, 1994 [DE] Germany .................. 44 23 214.4

[51] Int. Cl.$^6$ .................................................. H04N 9/66
[52] U.S. Cl. ...................... 348/639; 348/506; 348/441
[58] Field of Search .................. 348/638, 639, 348/640, 641, 643, 644, 645, 646, 649, 651, 654, 708, 505, 506, 441, 443, 458, 459; 358/137, 140, 19, 23; H04N 9/66, 9/45, 9/455

[56] References Cited

U.S. PATENT DOCUMENTS

| | | | |
|---|---|---|---|
| 5,309,233 | 5/1994 | Nishikawa | 348/441 |
| 5,335,074 | 8/1994 | Stec | 348/537 |
| 5,459,524 | 10/1995 | Cooper | 348/639 |

FOREIGN PATENT DOCUMENTS 0226649  9/1989  European Pat. Off. .
1415519  10/1972  United Kingdom .

OTHER PUBLICATIONS

ITT Semiconductors Advance Information, VPX 3220; Video Pixel Decoder, edition of May 2, 1994; 6 251-368-1A1.

Primary Examiner—Sherrie Hsia
Attorney, Agent, or Firm—Daniel J. Staudt

[57] ABSTRACT

The invention relates to a digital multistandard decoder for composite video signals. The multistandard decoder according to the invention can selectively process NTSC or PAL video signals and there is no need to know the corresponding signal standard beforehand. It comprises a sample rate converter, which converts the sample values of the video signals digitized with a first predetermined clock frequency into video signal sample values of a second virtual sampling frequency, has a phase-locked loop for controlling the sample rate converter, which incorporates a sync detector, in order to determine the line sync pulse and set the virtual sampling frequency to an integer multiple of the line frequency of the video signal, and a burst detector in order to set the virtual sampling frequency synchronously with the phase of the color subcarrier signal of the video signal, and a decoding—demodulating device for the recovery of the luminance and chrominance signal components from the video signal sample values of the virtual sampling frequency.

14 Claims, 7 Drawing Sheets

LINE & BURST PLL

MULTISTANDARD DECODER FOR VIDEO SIGNALS AND VIDEO SIGNAL DECODING METHOD

FIELD OF THE INVENTION

The invention relates to a digital multistandard decoder for video signals and to a method for decoding video signals.

BACKGROUND OF THE INVENTION

Color video signals, so-called composite video, blanking and sync signals (CVBS;) are essentially composed of a brightness signal or luminance component (Y), two color difference signals or chrominance components (U, V or I, Q), vertical and horizontal sync signals (VS, HS) and a blanking signal (BL). The structure of a composite video signal (CVBS) and the corresponding Y, U and V signals is shown in FIGS. 1a and 1b.

Figure 1A:
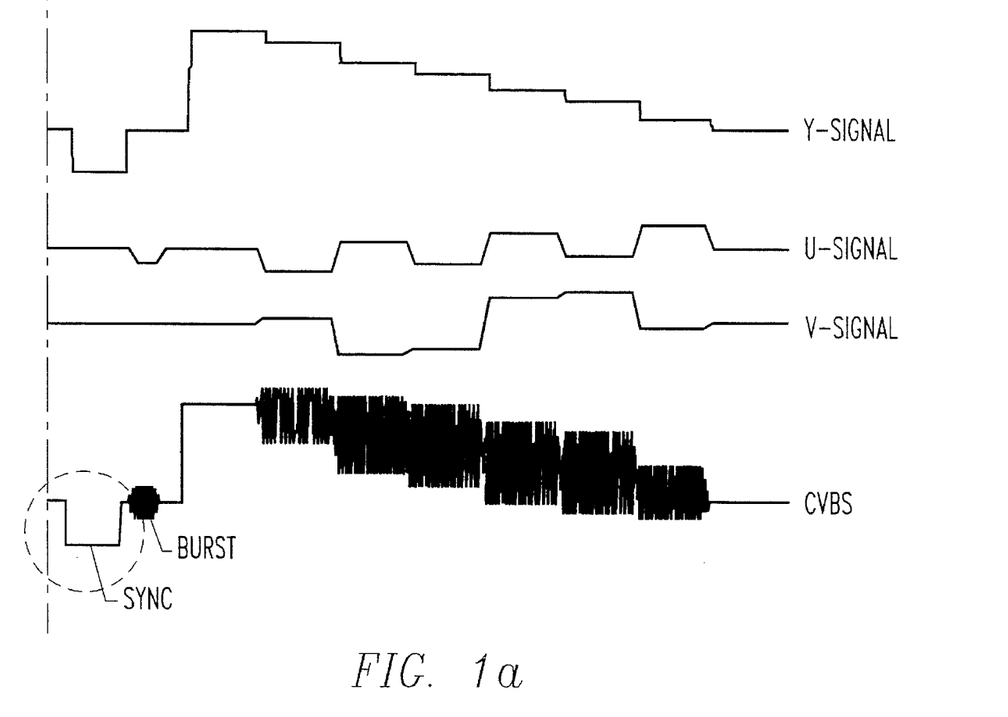
FIG. 1aA composite EBU color bar video signal (CVBS) and the corresponding Y, U and V signals.
Figure 1B:
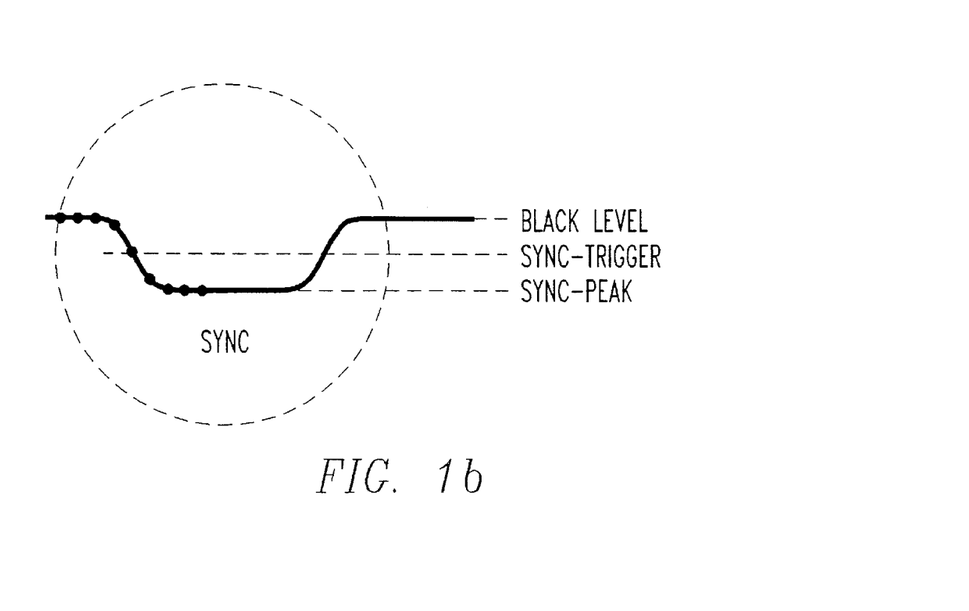

FIG. 1a shows a composite video signal for an EBU (European Broadcasting Union) color bar test signal, in which the six hue (tint) values belonging to the vertical color bar in "carrier packets" with color carrier frequency are superimposed on the luminance component Y. For the color carrier generation a color subcarrier frequency sync signal, the burst, is transmitted directly behind the line sync pulse, SYNC. The burst phase and the burst amplitude are used as reference values for determining the hue and the color saturation of the demodulated signal, which is represented by the individual carrier packets.

The different coding processes, e.g. NTSC, PAL and SECAM, introduced into the known color television standards, differ in the nature of the chrominance transmission and in particular the different systems make use of different color subcarrier frequencies and different line frequencies.

The following explanations relate to the PAL and NTSC systems, but correspondingly apply to video signals of other standards and non-standardized signals.

The color subcarrier frequency (fsc) of a PAL system and a NTSC system is fsc(NTSC)=3.58 MHz or fsc(PAL)=4.43 MHz.

In addition, in PAL and NTSC systems the relationships of the color subcarrier frequency (fsc) to the line frequency (fh) are given by fsc(NTSC)=227.50*fh or 4·fsc(NTSC)=910·fh fsc(PAL)=283.75*fh or 4·fsc(PAL)=1135·fh so that the phase of the color subcarrier in the case of NTSC is changed by 180°/line and in PAL by 270°/line.

In the case of digital video signal processing and decoding the prior art fundamentally distinguishes between two system architectures. These are the burst-locked architecture and the line-locked architecture. These systems operate with sampling frequencies for the video signal, which are produced in phase-locked manner to the color subcarrier frequency transmitted with the burst pulse or in phase-locked manner with the line frequency, respectively.

In the case of decoders with a burst-locked architecture the sampling frequency is chosen in such a way that on the one hand it is not too high so as to keep the power loss low and on the other hand so that the Nyquist theorem is fulfilled. i.e. $f_a > 2 \cdot fsc$. For problem free processing of the modulated color carrier in the decoder it is appropriate to use a sampling frequency which corresponds to the even multiple of the color subcarrier. Four times the color subcarrier frequency is preferred.

In the case of line-locked architectures the clock of the digital system is derived from the line frequency and is an integer multiple of the line frequency, so that an integer number of pixels per line are produced. Although the burst-locked system has advantages with respect to the minimum effort and expenditure for color decoding, but it also has disadvantages, in the horizontal and vertical synchronization, as well as in multistandard and "non-standard" uses. As the sampling process is essentially non-orthogonal, the burst-locked system is only suitable for the direct representation of images on a screen, but not for producing data for fixed raster applications, e.g., for field or frame stores or for frame grabbers in a PC environment.

Although the line-locked systems solve the problems of burst-locked architectures in a satisfactory manner, they still lead to new problems. In particular, they lead to much more complex color decoders, a high circuitry expenditure for the analog clock generation and higher requirements for the maximum acceptable dynamic non-linearities of the A/D converters and preceding analog signal processing stages.

Both systems suffer from the disadvantages that the clock frequencies for digitizing the video signal are derived from the video system, namely from the color subcarrier frequency or from the line frequency. Whereas in a PC environment, working takes place with completely different clock frequencies. The different clock frequencies in the overall system intermodulation products and causes crosstalk of signals which has a disturbing effect on the overall operation and the image quality. As the clock frequencies of PCs are not generally suitable for sampling video signals, and because they do not satisfy the above-explained conditions, the prior art decoders in each case have their own oscillators for producing the sampling frequency suitable for a particular television standard.

In summary, Table I gives different sampling frequencies and their advantages/disadvantages for digital video processing:

TABLE I

| Sampling Frequency | Advantages | Disadvantages |
|---|---|---|
| Burst-locked ($4 \cdot f_{sc}$) | Simple color decoder. No distortion due to non-linearities. | Complicated line synchronization. A sample rate conversion is necessary for field/frame storages. For multistandard operation multiple crystals are necessary. |
| Line-locked ($n \cdot f_H$) | Simple field/frame storage. Only one crystal for multistandard operation. | Complicated color decoder. Sensitive to non-linearities in composite video signal. |

The best choice with respect to these factors is dependent on the market, the function and intended use of the decoder. A rough survey is given in Table II.

TABLE II

| Market | Use | Preferred Sampling |
| --- | --- | --- |
| TV set | Replacement of analog circuit. | Burst-locked |
| TV set | Additional features (field/frame store) | Line-locked |
| Desk top video (PC) | Fixed video image size in a window. | Burst-locked |
| Desk top video (PC) | Scalable video image size in a window. | Line-locked |

SUMMARY OF INVENTION

The invention solves the above problems by providing a decoder for digital video signals and a composite video signal decoding method, which can process video signals according to different standards on the basis of a random, predetermined clock frequency of a host system; e.g., a PC.

The invention provides a digital multistandard decoder for composite video signals, comprising a sample rate converter, which converts the sample values of the video signal digitized at a first predetermined clock frequency into video signal sample values of a second virtual sampling frequency. The invention also provides a phase-locked loop for controlling the sample rate converter and which has a sync detector in order to determine the line sync pulse and set the virtual sampling frequency to an integer multiple of the line frequency of the video signal. Also, a burst detector is utilized in order to set the virtual sampling frequency synchronously with the phase of the color subcarrier signal of the video signal, and a decoding—demodulating device for the recovery of the luminance and chrominance signal components from the video signal sample values at the virtual sampling frequency.

Preferably, the decoder according to the invention is designed so that the sync detector comprises a coarse sync detector and a fine sync detector. The coarse sync detector determines the line sync pulse of the video signal, in order to set the virtual sampling frequency to an integer multiple of the line frequency of the video signal (coarse phase-control). The fine sync detector determines an edge of the line sync pulse in order to set the phase of the virtual sampling frequency synchronously with the line frequency (tine phase control). The burst detector determines the phase of the color subcarrier signal active during the burst pulse, in order to set the phase of the virtual sampling frequency synchronously with the phase of the color subcarrier frequency (lock-in).

According to an embodiment of the invention the phase-locked loop has a threshold/hysteresis means, which either activates the coarse sync detector or the fine sync detector or the burst detector. The device gives different switching levels for the transition from the coarse phase control to the fine phase control to lock-in than for the transition in the opposite direction.

The given clock frequency can be the operating clock frequency of a host system for the detector.

It is particularly advantageous if the virtual sampling frequency is four times the color subcarrier frequency.

The decoder according to the invention preferably has a chroma gain control means, which evaluates the chrominance information of the burst pulse and generates a signal (coki), which indicates whether the virtual sampling frequency has the desired ratio to the color subcarrier frequency.

The invention also relates to a method for decoding composite video signals. The sample values of the digitized video signal at a first predetermined clock frequency are converted into video signal sample values at a second virtual sampling frequency, by determining the time position of the line sync pulse producing the virtual sampling frequency in phase-locked manner as an integer multiple of the line frequency (coarse phase control), the phase of the color subcarrier signal active is determined during the burst pulse and setting the phase of the virtual sampling frequency synchronously with the phase of the color subcarrier signal (lock-in). The sample values are produced at the virtual sampling frequency by interpolation from the sample values at the first predetermined clock frequency, the luminance and chrominance signal components of the video signal are recovered from the video signal sample values at the virtual sampling frequency.

In addition, in the method according to the invention following the coarse phase control and before synchronizing the virtual sampling frequency with the phase of the color sub-carrier signal, a flank of the line sync pulse is determined and the phase of the virtual sampling frequency is set synchronously with the line frequency (fine phase control).

Finally, in the method according to the invention, the fine phase control is only enabled when the coarse phase control has been completed and the lock-in is only enabled when the fine phase control has been completed.

Preferably, in the method according to the invention, there are different switching levels for the transition from coarse phase control to fine phase control and to lock-in than for the transition in the opposite direction.

According to an embodiment of invention, the first predetermined clock frequency can be the operating clock frequency of a host system for the decoder.

In the method according to the invention, the virtual sampling frequency is set as an integer multiple of the line frequency, which corresponds to four times the expected color subcarrier frequency.

According to the invention, the chrominance information of the burst pulse is evaluated and, as a function of the evaluation result, it is determined whether the virtual sampling frequency was produced in the correct relationship to the color subcarrier signal. It is also possible to provide the virtual sampling frequency at 910 or 1135 times the line frequency of the video signal.

The multistandard decoder essentially comprises an input sample rate converter, a phase-locked loop for controlling the sample rate converter and a decoding—demodulating device, which can be a standard digital video signal decoder.

The function of the sample rate converter is to produce from an existing clock of a host system a "virtual" clock frequency of four times the color subcarrier frequency for NTSC and PAL input signals (4·fsc). The difficulty in the aforementioned prior architectures is that they must be able to operate for a wide range of host clock frequencies, approximately from 20 to 40 MHz, without there being a reliable reference frequency, for example, for a crystal oscillator. The control of the sample rate conversion is the function of the phase-locked loop.

Conventional color subcarrier phase-locked loops would fail for two reasons under these conditions. Firstly due to the possibility of side-locking a color subcarrier phase-locked loop would require an accuracy range for the lock-in and the target range of less than 5 kHz. In addition, the noise bandwidth of the phase-locked loop would have to be smaller than 300 kHz, so that the flywheel effect would still be effectively usable when the burst was very noisy.

The side-locking problems will now be briefly explained. As the phase detector of a color subcarrier phase-locked loop only produces a reliable output signal if the burst pulse occurs, it is "blind" for the main part of each horizontal line. This blindness leads to an ambiguous result for each frequency, which is repeated with the same phase in each line. This means that the phase detector cannot detect a difference if a frequency is an integer multiple of the line frequency; i.e., at . . . , 909·fh, 910·fh, 911·fh, . . . or . . . , 1134·fh, 1135·fh, 1136·fh . . . . In conventional systems this problem is solved in that a crystal oscillator with limited tolerances is set to the desired center frequency. Therefore, multistandard decoders always require multiple crystals.

However, the hierarchic structure for controlling the sample rate converter according to the invention requires no reference crystal.

The video signal processing system according to the invention can operate with a random clock frequency (predetermined clock frequency) of a host system, if it satisfies the following conditions:

Frequency: $\geq 12$ MHz (Nyquist—Shannon theorem) Precision,

Long-term stability: $\leq 4$ kHz (to prevent side-locking) Fluctuations,

Short-term stability: $\leq 400$ Hz (for a demodulation error $<2°$)

Virtually any PC clock produced by a crystal fulfills these conditions, so that the invention can be realized with a predetermined PC clock. The multistandard decoder according to the invention uses the sample rate conversion in order to reinterpret the individual sample values of a data stream digitized with the predetermined clock frequency as if they corresponded to another "virtual" sampling frequency. In the case of a multistandard decoder the virtual sampling frequency can be adapted to the corresponding standard of the incoming video signal of a NTSC or PAL system or some other video system.

An important feature of the multistandard decoder according to the invention is consequently the sample rate conversion of the sample values that are digitized with a predetermined clock frequency into desired sample values or a second virtual sampling frequency, which corresponds to a given multiple of the line frequency. The multistandard decoder can automatically recognize the line frequency of the incoming video signal, so that video signals of different standards can be processed.

The sample rate conversion is a necessary prerequisite for each color decoder, which does not operate with a fixed pre-determined clock frequency generated by a crystal.

According to the invention the sample rate converter is controlled by a hierarchically constructed phase-locked loop, which initially performs a coarse phase control, it determines the sync pulse of the video signal and sets the virtual sampling frequency to a clearly defined integer multiple of the line frequency (fh), namely 910·fh for NTSC signals and 1135·fh for PAL signals. Then, by means of a fine phase control, the sampling frequency is set in such a way that a clearly defined phase of the sampling frequency is synchronous to a trigger pulse (of the rising edge of the sync pulse). When the synchronous phase relationship has been established, the color subcarrier frequency transmitted with the burst pulse is determined and the virtual sampling frequency is produced in phase-locked manner with the phase of the color subcarrier frequency. In the hierarchic arrangement of the different control planes for the sampling frequency it is very important that only one stage is simultaneously active, so that no chaotic or undefined states can occur.

BRIEF DESCRIPTION OF DRAWINGS

The invention is described in greater detail hereinafter with respect to a preferred, non-limitative embodiment and with reference to the following drawings:

FIG. 1b being a detail enlargement of FIG. 1a.

DETAILED DESCRIPTION OF INVENTION

Figure 2:
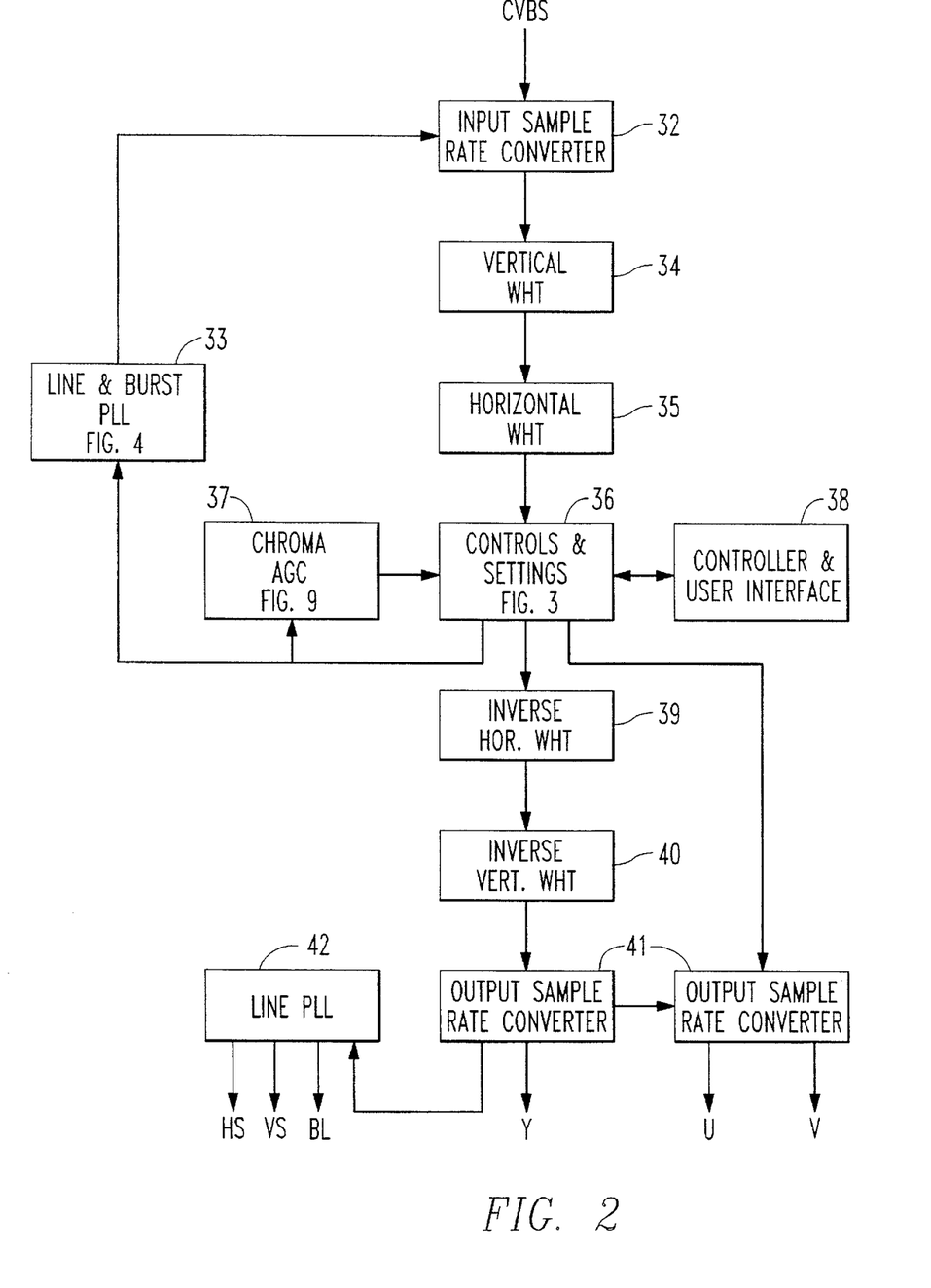
FIG. 2 A block circuit diagram of a preferred embodiment of the digital multistandard decoder according to the invention.

FIG. 2 shows a block circuit diagram at a preferred embodiment of the digital multistandard decoder according to the invention. The digital multistandard decoder comprises an input sample rate converter (SRC) 32, a line and burst phase-locked loop (PLL) 33, a vertical WHT circuit 34 and a horizontal WHT circuit 35, a control and setting circuit (controls and settings) 36, a chroma automatic gain control circuit 37 (Chroma AGC), a controller and user interface 38, a horizontal IWHT circuit 39 and a vertical IWHT circuit 40, an output sample rate converter (SRC) 41 and a line phase locked loop (PLL) 42.

The composite signal (CVBS) e.g. digitized with the clock frequency of a host system, such as a computer, is inputted into the input sample rate converter 32. The line and burst phase-locked loop 33 controls the input sample rate converter 32, in the manner described hereinafter, so that the input video signal digitized with the predetermined clock frequency is converted into a signal with the sample values of a second virtual sampling frequency, which is four times the color subcarrier frequency. By choosing the "virtual" sampling frequency as four times the color subcarrier frequency on the Shannon-Nyquist theorem ($f_a > 2 \cdot f_{sc}$) is fulfilled and an integer number of sample values per video image signal is obtained, namely 910 sample values per line for a NTSC signal and 1135 sample values per line for a PAL signal. Thus, it is possible to combine the advantages at a phase-locked architecture, in which the sampling signal is an even multiple of the color subcarrier frequency, with the advantages of the line-locked architecture in which the sampling frequency is an integer multiple of the line frequency. The sample values of the video signal (CVBS) at the virtual sampling frequency are then passed onto the vertical WHT circuit 34, whose output supplies the input signals for the following horizontal WHT circuit 35.

In the vertical and horizontal WHT circuit 34 and 35 the input sample values of the video signal are transformed by means of a 2×4 Walsh-Hadamard transformation (WHT) from the pixel domain into the WHT domain, so that they can be processed by means at the central control and setting circuit 36.

Each individual output coefficient at the Walsh-Hadamard transformation represents a linear combination of all the input sample values (pixels) for said WHT, so that a single WHT output coefficient cannot be associated with a specific input sample value. In fact a set of WHT output coefficients reproduces the two-dimensional spectrum at all the input sample values for a given block of a given size.

The transformation of the digitized video signal by means of a Walsh-Hadamard transformation into the WHT domain and the processing of the signal in the WHT domain has proved particularly advantageous for bringing about a cost-optimized digital multistandard decoder for video signals. Such a decoder and a corresponding digital video signal decoding process, which makes use of the advantages of the Walsh-Hadamard transformation, form the subject matter of the corresponding patent application of the same applicant filed herewith, Ser. No. 08/496,868, entitled "Digital Decoder for Video Signals and Video Signal Digital Decoding Method", to which is incorporated herein by reference.

The vertical WHT circuit essentially forms a vertical low-pass filter and a vertical high-pass filter. The corresponding sample values of two video image lines are added and subtracted, respectively. In the horizontal WHT circuit, in alternating manner, one line of the high and low-pass-filtered sample values of each case are transformed by means of the Walsh-Hadamard transformation into the WHT domain. The resulting WHT matrix is inputted into the control and setting circuit 36, in which the chrominance signal components U and V are separated from the luminance signal component Y and all the controls and settings of the video signal can be centrally performed in said circuit, in the manner described hereinafter.

The WHT matrix from which the chrominance signal components were separated is then transformed back into the pixel domain by means of the horizontal IWHT circuit 39 and the vertical IWHT circuit 40 and the decoded video signal components U, V and Y can, following an optional output sample rate conversion by the output sample rate converter 41, be outputted by the digital decoder.

In the digital multistandard decoder according to the invention the decoding-demodulating device for the recovery of the luminance and chrominance signal components from the video signal sample values with the virtual sampling frequency, can be realized in a different manner to that described. The processing of the video signal can take place in the pixel domain (time range) or in the frequency domain with any known digital video signal decoder, which is selectively able to process NTSC and PAL signals. The input sample rate converter 32, controlled by the line and burst phase-locked loop 33, ensures that the standard of the particular video signal is recognized and that the virtual sampling frequency is correctly set.

Hereinafter, the construction and function of the circuit parts of the digital decoder of FIG. 2 essential for multistandard operation are described. The heart of the digital multistandard decoder is the line and burst phase-locked loop 33, which so controls the input sample rate converter 32 that it converts the sample values of the video signal digitized with a first predetermined clock frequency into video signal sample values of a second virtual sampling frequency. This conversion is four times the color subcarrier frequency and therefore 910·fh for NTSC signals and 1135·fh for PAL signals, so that the video signal can be processed in an optimum manner in the following decoding-demodulating device. For determining the correct virtual sampling frequency for a video signal of an unknown standard, NTSC or PAL, the line and burst PLL 33 requires the line sync signal and burst pulse of the input video signal (CVBS). The function at the line and burst PLL is to lock-in the virtual sampling frequency in the correct relationship and in phase-locked manner to the color subcarrier frequency transmitted with the burst pulse.

Figure 3:
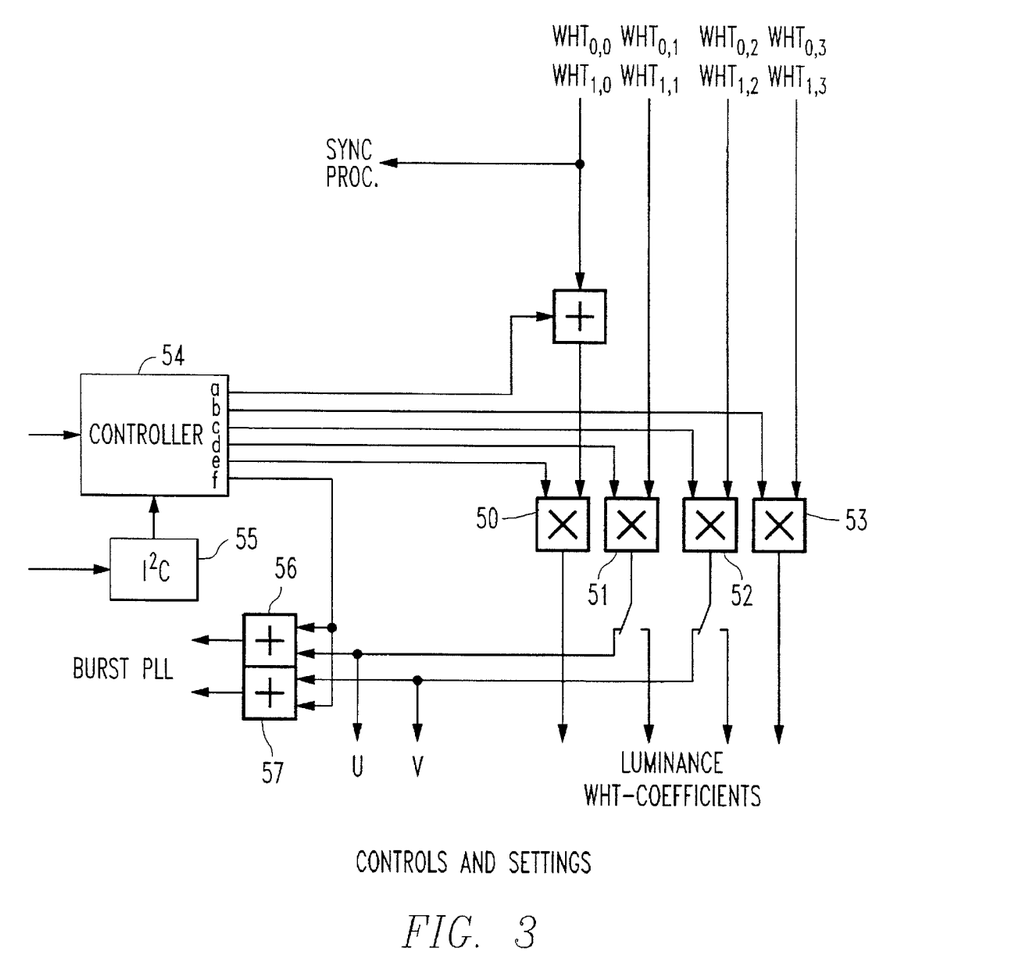
FIG. 3 A circuit diagram for realizing the control and setting of the decoder of FIG. 2.

The line sync pulse and the burst pulse of the video signal are, according to the preferred embodiment of the invention, derived from the control and setting circuit 36, shown in detail in FIG. 3. However, they could also be produced in some other way, known to those skilled in the art, from the input video signal. The setting and control circuit shown in FIG. 3 has four multipliers 50 to 53, which are connected to a controller 54 and via an IC bus 55 to a user interface in the indicated manner. Into the control and setting circuit of FIG. 3 are inputted the transformation coefficients of the WHT matrix $WHT_{0,0}$ to $WHT_{0,3}$ and $WHT_{1,0}$ to $WHT_{1,3}$, which are formed by a 2×4 Walsh-Hadamard transformation of the input sample values.

As a result of the characteristics of the Walsh-Hadamard transformation, whose transformation coefficients appear as sampled values of a set of filters, the color difference signals U and V can be directly derived as specific WHT coefficients from the control and setting circuit 36. They form the basis for the determination of the burst pulse and for synchronizing the virtual sampling frequency with the color subcarrier frequency transmitted with the burst pulse.

In the case of a 2×4 WHT of the input sample values corresponding to the preferred embodiment of the invention the color difference signals U and V can be read out directly as WHT coefficients $WHT_{1,1}$ and $WHT_{1,2}$. They are tapped at the outputs of the multipliers 51 and 52 and supplied to the burst phase detector of the phase-locked loop 33, optionally together with the control signal from the output f of the controller 54.

Unlike in known system architectures for digital decoders, in the case of the multistandard decoder according to the invention all the control and setting functions are combined in a single hardware stage. The controller can control and set outputs a to f the WHT coefficients and consequently the video signal to be decoded.

The WHT coefficient $WHT_{0,0}$ corresponds to a horizontally and vertically low-pass-filtered version of the input signal and which is highly suitable for the processing of the line sync pulse of the video signal. Therefore the WHT coefficient $WHT_{0,0}$ for sync pulse processing (SYNC proc.) is tapped at the input of the control and setting circuit of FIG. 3.

Figure 4:
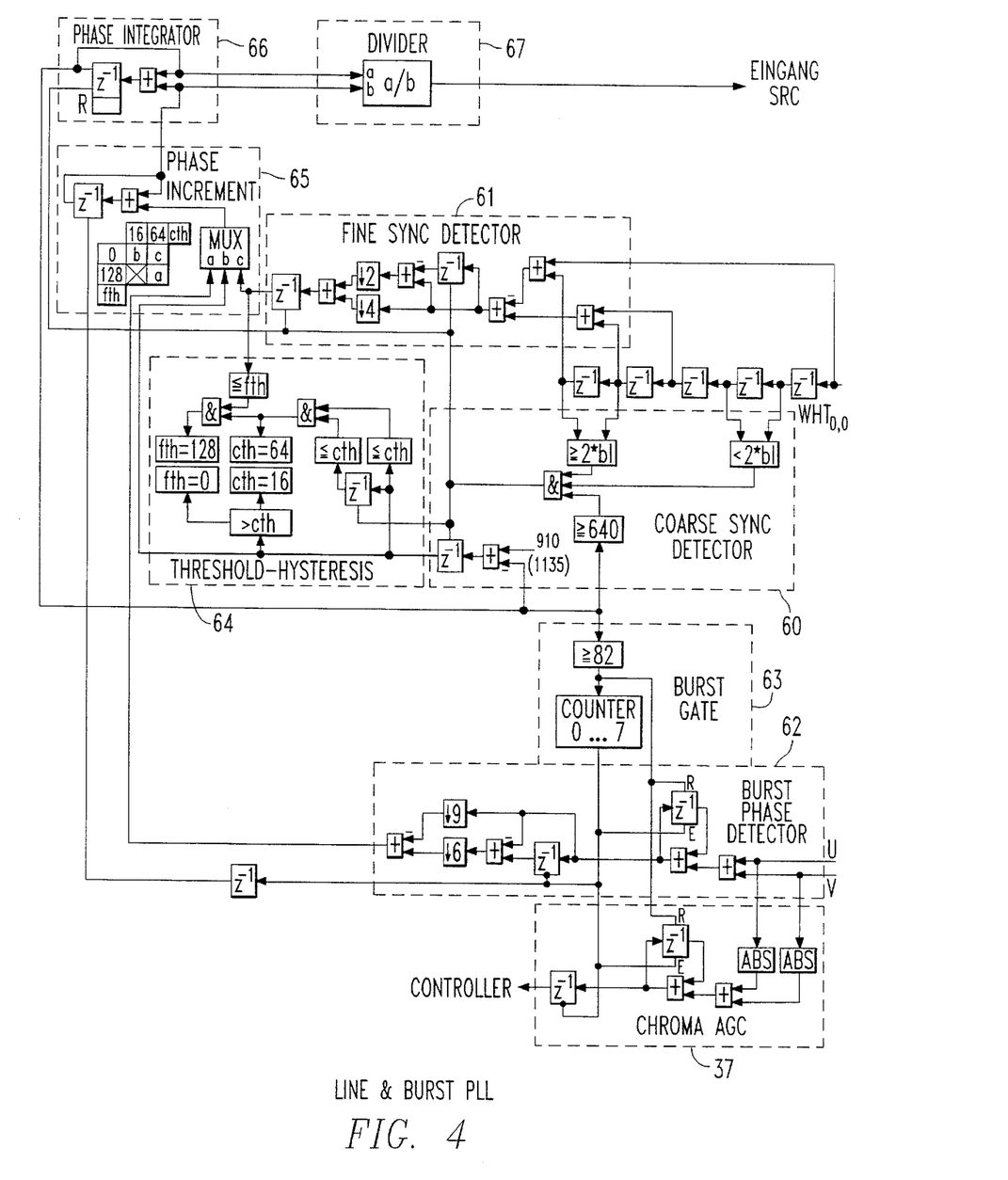
FIG. 4 A circuit diagram for realizing the line/burst phase-locked loop of the decoder of FIG. 2.

The line and burst PLL 33 for controlling the input sample rate converter 32 is shown in FIG. 4 and in detail in the following drawings. The line and burst PLL of FIG. 4 comprises a coarse sync detector 60, a fine sync detector 61 and a burst phase detector 62. There are also a burst gate circuit 63, a threshold/hysteresis circuit 64 and a phase increment circuit 65, as well as a phase integrator circuit 66 and a divider 67. The connections of the individual circuit components of the line and burst PLL are shown in the circuit diagram of FIG. 4, which also shows the chroma automatic gain control circuit 37 (Chroma AGC).

The following generally describes control of the sample rate converter via the line and burst PLL. The virtual sampling frequency is determined in that initially the coarse sync detector 60 separates the sync pulse from the digitized video signal and establishes its time position in order to determine the line frequency. It is then assumed that it is either a NTSC or a PAL signal. For this purpose the user or manufacturer of the decoder can set default values for the sample rate factor, depending on the particular country in which the equipment will be operated, namely at 910 or 1135.

Synchronously with the sync pulse an integral multiple of the line frequency (910·fh or 1135·fh) is produced as a first approximation of the virtual sampling frequency, the coarse sync detector being set with such a wide search window that it always finds a sync pulse.

If the operation of the coarse sync detector 60 is sufficiently stable, there is a switchover to the fine sync detector 61, which determines in a relatively narrow search window, on the basis of the approximate position of the sync pulse determined by the coarse sync detector, the leading edge of the sync pulse. The leading edge is determined by the precise time position of the sync pulse and by locking the virtual sampling frequency precisely in the edge of the sync pulse. This prevents side-locking, which could occur in the case of only a phase-locked control of the virtual sampling frequency relative to the phase of the color subcarrier signal during the burst pulse.

Following stable fine phase control the phase of the color subcarrier frequency can be determined by the burst phase detector 62 and the sampling frequency can be set synchronously to this phase. The burst pulse represents a time window during which the color subcarrier reference signal is transmitted. The determined, virtual sampling frequency and phase are outputted as a control signal to the sampling rate converter 32.

Figure 5:
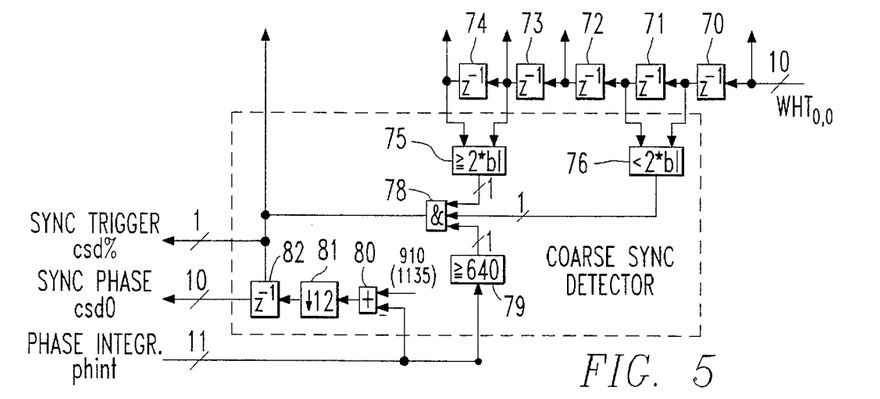
FIG. 5 A circuit diagram for realizing the coarse synchronous detector of the phase-locked loop of FIG. 4.

The individual circuit components of the line and burst PLL of FIG. 4 and their operation are described hereinafter relative to FIGS. 5 to 12. FIG. 5 shows a circuit diagram of the coarse sync detector, which determines the line sync pulse of the video signal. Upstream of the coarse sync detector are five series-connected delay stages 70 to 74, through which passes the $WHT_{0,0}$ coefficient and which is then further processed in the coarse sync detector. The circuit of FIG. 5 also comprises two comparators 75, 76, an AND gate 78, a comparator 79 and a series connection of an adder 80, a binary divider 81 and a delay element 82, which are interconnected as shown in FIG. 5.

The WHT coefficient $WHT_{0,0}$ outputted by the horizontal WHT circuit 35 corresponds to a horizontally low-pass-filtered version of the CVBS input signal of the digital decoder. At the end of setting and synchronization of the virtual sampling frequency the WHT coefficient $WHT_{0,0}$ corresponds to a horizontally and vertically low-pass-filtered version of the CVBS signal. In each case $WHT_{0,0}$ is used for suppressing the high frequency color subcarrier, which would otherwise possibly disturb the detection of the line sync pulse. The limited bandwidth of the WHT coefficient $WHT_{0,0}$, which is determined by the order of the upstream Walsh-Hadamard transformation, also determines a nominal edge slope of the line sync pulse and prevents possible peaks in the input signal.

The coefficient $WHT_{0,0}$ forms the input signal for the line sync pulse processing. A leading, falling sync edge is determined if the comparators 75 and 76 indicate that at least two successive values of $WHT_{0,0}$ are higher or equal to a sync switching level ($\geq 2 \cdot bl$). A following value of $WHT_{0,0}$ has a random value and at least two further following values of $WHT_{0,0}$ are smaller than the sync switching level ($< 2 \cdot bl$). The sync switching level is defined as the value between the black level and the peak value of the sync pulse, as shown in FIG. 1b.

In order to reduce the susceptibility to possible signal peaks and to fade out equalizing pulses, the coarse sync detector of FIG. 5 is only active if the phase integrator exceeds a value of "640". In this case the comparator 79 emits a "1" signal. If the above conditions for a falling sync edge are fulfilled, then a sync trigger signal (csd%) is outputted. In addition, the difference (csd0) of the phase integrator value with respect to the nominal number of sample values per line (910 or 1135), as shown in FIG. 5, is stored and transferred, in order to indicate the instantaneous phase relationship between the line sync pulse and the phase integrator for controlling the sample rate converter. The loop gain is set by means of the binary divider 81 by a 12 bit offset to 1/4096.

Figure 6:
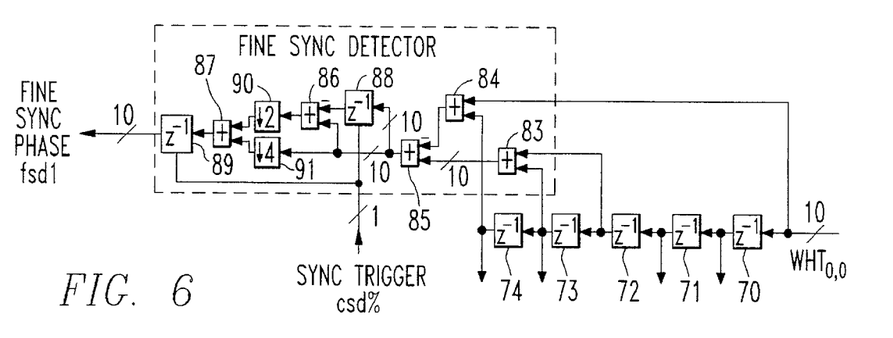
FIG. 6 A circuit diagram for realizing the fine synchronous detector of the phase-locked loop of FIG. 4.

If the coarse sync detector of FIG. 5 has determined a line sync pulse and outputted a sync trigger signal, the fine sync detector of FIG. 6 is activated in order to synchronize the virtual sampling frequency precisely with the leading edge of the sync pulse. It forms a PI controller for controlling the virtual sampling frequency synchronously to the line frequency of the video signal.

The fine sync detector shown in FIG. 6 comprises five adders 83 to 87, two delay elements 88, 89 and two binary dividers 90, 91, shown in interconnected form in FIG. 6. From the sum of the $WHT_{0,0}$ values delayed by three and four clock pulses is subtracted the sum of the undelayed $WHT_{0,0}$ value and its counterpart delayed by five clock pulses, as shown in FIG. 6. As the phase increments are accumulated before being inputted into the phase integrator, the proportional value must be produced by means of a differentiation 86, 88, whereas the integral value is directly accessible.

The proportional value is divided by four, by a two bit shift in the binary divider 90 and the integral value is divided by 16, by a four bit shift in the binary divider 91. By switching on the values controlled by the sync trigger signal (csd%), which is derived from the coarse sync detector, the output signal (fsdl) of the fine sync detector is generated once per horizontal line.

When the synchronization of the sampling frequency to the line sync pulse of the video signal is terminated, the line and burst phase-locked loop is switched to the burst detector, which forms a PI controller for the virtual sampling frequency relative to the color subcarrier frequency.

Figure 7:
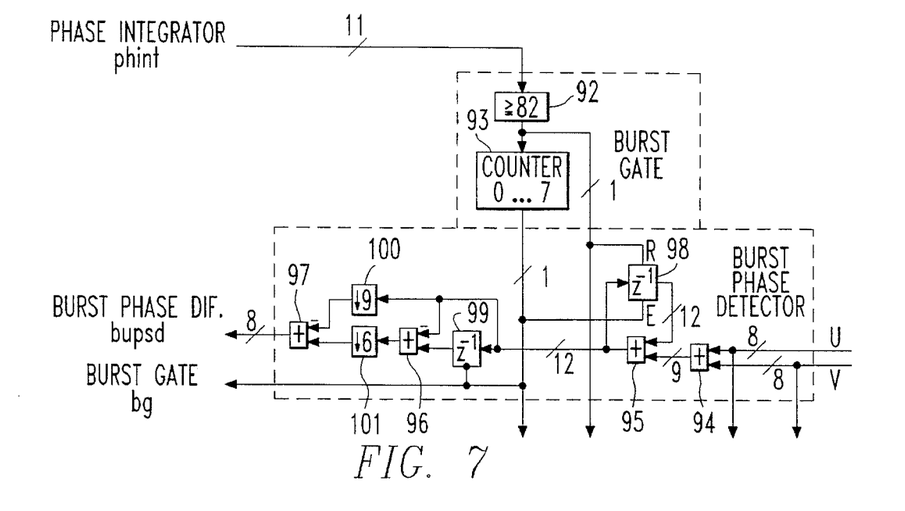
FIG. 7 A circuit diagram for realizing the burst phase detector of the phase-locked loop of FIG. 4.

By means of the burst gate circuit shown in FIG. 7 and which comprises a comparator 92 and a counter 93 is determined a burst gate pulse. The burst gate is opened when the integer part of the output signal (phint) of the phase integrator exceeds a predetermined value of "82". The burst gate duration is fixed on 8 clock pulses.

For the duration of the opening of the burst gate the phase of the color subcarrier signal transmitted with the burst pulse is determined in the burst phase detector shown in FIG. 7.

The burst phase detector of FIG. 7 comprises four adders 94 to 97, two delay elements 98, 99 and two binary dividers 100, 101, which are interconnected in the manner shown in FIG. 7. The input signal is constituted by the color difference signals U and V or, in the represented embodiment of the digital decoder, the WHT coefficients $WHT_{1,1}$ and $WHT_{1,2}$.

The sum of the color difference signals is formed in the adder 94 and accumulated in a adder 95, which is reset at the start of the burst gate and is activated for its duration. For the nominal burst phase of 135° the accumulated sum, as expected and necessary, passes to zero. This value is divided by 512 by means of a nine bit shift or offset in the binary divider 100 and subtracted from the differentiated, corresponding value, which has previously been divided by 64 by a six bit shift or offset in the binary divider 101. The result is outputted as a burst phase difference (bupsd) together with the burst gate signal (bg).

Figures 8, 9:
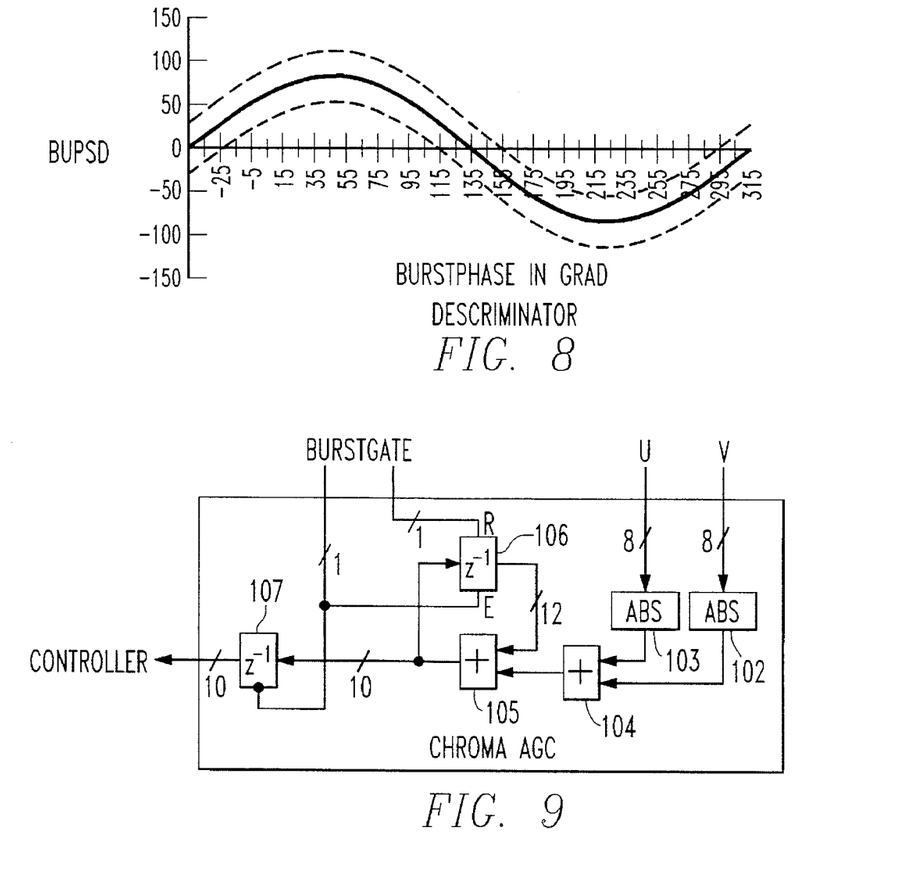
FIG. 8 A curve for explaining the discriminator characteristics of the burst phase detector of FIG. 7.
FIG. 9 A circuit diagram for realizing the automatic gain control for the chrominance signal.

FIG. 8 shows the discriminator characteristics of the burst phase detector of FIG. 7 if, for the control of the chromaticity, constant values are added to the color difference signals U and V. This addition is performed in the adders 56, 57 of the control and setting circuit of FIG. 3, which brings about a phase shift of the virtual burst phase.

The chroma automatic gain control circuit 37 (Chroma AGC), shown in FIG. 9, operates in parallel with the burst phase detector 62. The Chroma AGC of FIG. 9 comprises two absolute value elements 102, 103, two adders 104, 105, as well as two delay elements 106, 107, shown in interconnected form in FIG. 9. Instead of adding the color difference signals U and V with their particular signs, like the burst phase detector, the Chroma AGC of FIG. 9 accumulates the absolute values of U and V while the burst gate signal is active and passes said accumulated value to the controller. In accordance with the accumulated value the controller corrects the multiplication factors for $WHT_{1,1}$ and $WHT_{1,2}$ outputted at its outputs c and d (FIG. 3), so that the output of the Chroma AGC circuit is the same as a user setting for color saturation. In addition, a color killer signal (coki) is set under one of the three following conditions:

1) if the phase-locked loop 33 (FIG. 2) is unloaded,
2) if U has the incorrect sign and
3) if the color subcarrier amplitude is too small.

This ensures that in the case of significant interference, e.g. if the incorrect video signal standard is assumed, the chrominance components in the video signal are compressed and only a luminance signal for a black and white image is outputted. The color killer signal (coki) is used for checking whether the correct video standard has been assumed.

If coki=1, the coarse sync detector can be reactivated in order to determine the line sync signal but then in each case the other video standard is assumed, i.e. a sampling frequency of 1135·fh is selected if previously a sampling frequency of 910·fh was selected and vice versa.

Figure 10:
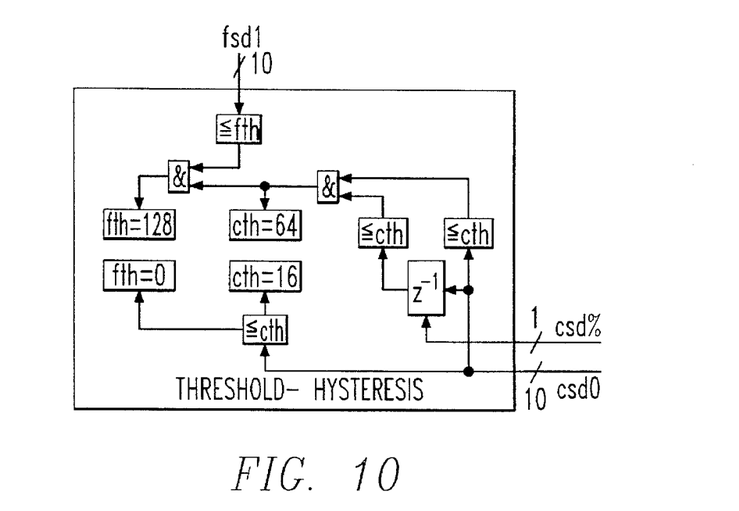
FIG. 10 A circuit diagram for realizing a threshold/hysteresis circuit of the phase-locked loop at FIG. 4.

In order to avoid undesired interference and reciprocal influencing of the individual stages of the hierarchically arranged phase-locked loop, precisely one and only one stage can be active at a single time. The selection is made by the threshold and hysteresis circuit shown in FIG. 10. The output signals of the coarse sync detector 60 and the fine sync detector 61 are inputted into the threshold and hysteresis circuit 64. As shown in FIG. 10, the threshold and hysteresis circuit determines different thresholds for the transition from coarse to fine phase control and for the opposite transition from fine to coarse phase control. This ensures that once the frequency for the virtual sampling clock has been set, the fine sync phase-locked loop can so finely tune this frequency that a clearly defined phase coincides with a threshold level of the leading edge of the sync pulse. When this synchronous phase relationship has been set up, then the burst phase-locked loop may take over the further control. In order to avoid deadlocking, unstable or chaotic states, only one stage of this hierarchy of the phase-locked loop may be active at a given time and in the case of a suitable hysteresis for the tolerance for switching from one stage to the other or for switching back into a higher-rank stage a re- liable control is ensured.

Whereas of the coarse sync detector 60, the fine sync detector 61 and the burst phase detector 62 only one is always active, so that in operation there is switching from a coarse- synchronized line PLL to a fine-synchronized line PLL and to a burst PLL. The phase incrementing circuit 65 and the phase integrator circuit 66 are always active.

Figure 11:
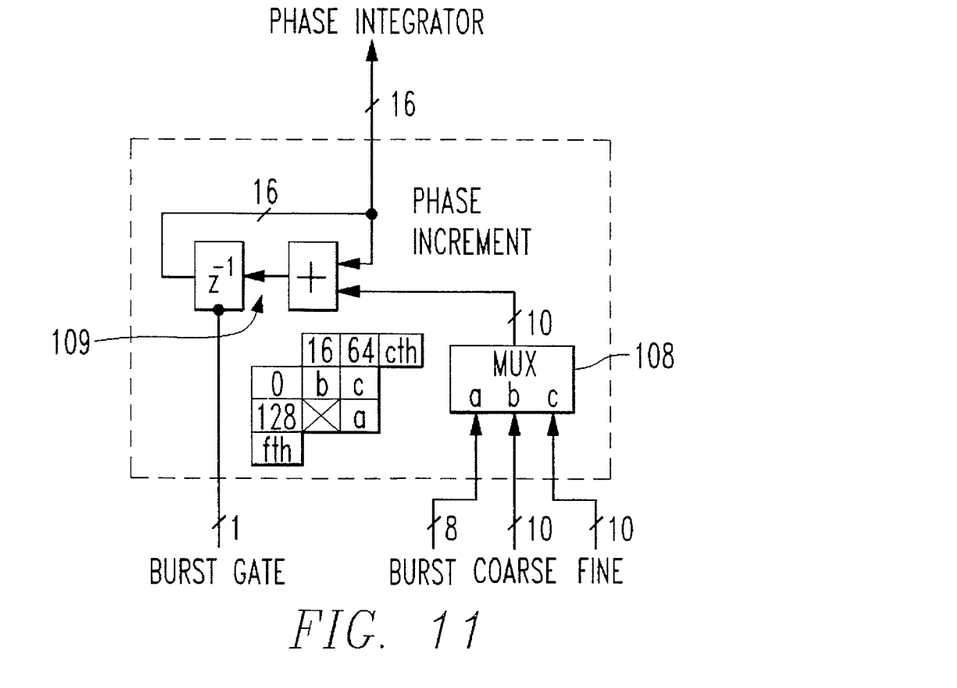
FIG. 11 A circuit diagram for realizing a phase incrementing circuit of the phase-locked loop of FIG. 4.

The phase increment or incrementing circuit is shown in FIG. 11 comprises a multiplexer device 108 and an integrator 109 constituted by an adder and a delay stage, which is switched on by the burst gate signal. Corresponding to the thresholds defined by the threshold and hysteresis circuit the multiplexer device 108 selects one of the three input signals from the coarse sync detector 60, the fine sync detector 61 or the burst phase detector 62. The phase increment, in accordance with the coarse, fine or burst phase different signal, is updated once during each horizontal line, which is controlled by the burst gate signal, and outputted to the phase integrator.

Figure 12:
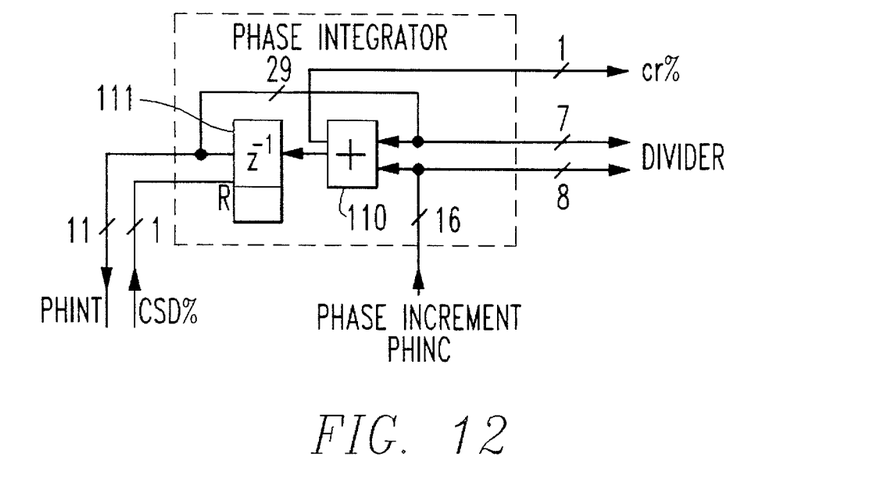
FIG. 12 A circuit diagram for realizing a phase integration in the phase-locked loop of FIG. 4.

The phase integrator circuit shown in FIG. 12 comprises an adder 110 and a delay stage 111, which can be interconnected in the disclosed manner. The phase integrator serves as the digitally controlled oscillator, which produces the virtual sampling frequency of $4·f_{sc}$, i.e. 910·fh or 1135·fh, for the sample rate converter. The phase integrator is timed by the burst gate pulse and accumulates the phase increments determined in the preceding stage. If the phase-locked loop is already locked in, the phase integrator accumulates increments up to an integer value of 910 or 1135. Additionally the intermediate pixel resolution of the sample rate converter 32 (FIG. 2), which according to a preferred embodiment of the invention is 1/32 (5 bits), a non-integer output of the phase integrator. The phase integrator circuit requires in the represented embodiment an overall resolution (precision) of 29 bits, 12 bits being required for the integer and 17 for the non-integer integrator output values.

As shown in FIG. 12 the sync trigger signal outputted by the coarse sync detector resets the integer bits of the accumulator, but the non-integer bits remain unaffected.

The carry of the phase integrator, i.e. the carry from the non-integer to the integer components, determines a time at which a given sample value for a sampling frequency of $4·f_{sc}$, is to be calculated by the input sample rate converter. The non-integer component of the output signal of the phase integrator specifies the intermediate pixel distance of the "virtual" sample value from an actual sample value as fractions of the host clock frequency.

However, the sample rate converter requires a control input value, relative to the output sampling rate ($4·f_{sc}$). As the phase increment indicates the relationship of the host clock frequency to $4·f_{sc}$, it is necessary to divide the non-integer component of the output value of the phase integrator by the value of the phase increment. This division is performed by the divider 67, The accuracy of this division must enable the sample rate converter to produce intermediate pixel increments of 1/32 (5 bits). In order to form an output signal with a precision of 5 bits, the input precision of the divider must be 7 bits for the numerator and 8 bits for the denominator.

The input sample rate converter 32 can be in accordance with the prior art. A particularly simple and advantageous sample rate converter suitable for digital multistandard video decoders is described in the corresponding application of the same applicant filed herewith, Ser. No. 08/497,181, entitled "Sample Rate Converter and Sample Rate Conversion Method" to which is incorporated herein by reference. Such a sample rate converter performs an equally weighted interpolation between each of two neighboring sample values and an amplitude correction. Then a further equally weighted interpolation of the corrected, first interpolation result is performed with its neighboring values and these can be neighboring sample values or neighboring interpolation results and the interpolation result obtained then again is subject to an amplitude correction. The equally weighted interpolation is then repeated until the desired resolution necessary for the virtual sampling frequency is reached, e.g. 1/32 of the host clock frequency. The control signal for the sample rate converter outputted by the phase-locked loop then determines the direction and magnitude of an offset for one virtual sample value relative to an actual sample value.

At the output of the digital multistandard decoder, according to the invention, can once again be provided by a sample rate converter controlled by a line and burst PLL, if the decoded video signal is to be further processed at a clock frequency other than $4 \cdot f_{sc}$. However, it is also possible to provide a simplified output sample rate converter 41 controlled by a line phase-locked loop 42 (FIG. 2). In the line PLL corresponding parts of the described line and burst PLL, namely the coarse and fine sync detectors are repeated, said parts being copied for the line PLL, but cannot be directly reused, because they must continuously monitor the burst PLL. For the output sample rate converter it is possible to use a simple linear interpolation between adjacent pixels, because only baseband signals Y, U and V and not composite video signals (CVBS) have to be processed, which with the color carrier frequency contain information with a high spectral component, which occurs after demodulation as a d.c. voltage. The requirements made concerning the linearity of the frequency-dependent gain function of the sample rate converter are therefore much less.

The features of the invention disclosed in the description, drawings and claims can be significant, either individually or in the form of random combinations, for the realization of the different embodiments of the invention.

While the method(s) herein described, and the form(s) of apparatus for carrying this (these) method(s) into effect, constitute preferred embodiments of this invention, it is to be understood that the invention is not limited to this (these) precise method(s) and form(s) of apparatus, and that changes may be made in either without departing from the scope of the invention, which is defined in the appended claims.

What is claimed is:

1. A digital decoder for video signals having a luminance signal component, chrominance signal component, color subcarrier signal, color subcarrier frequency, burst pulse and line sync pulse, comprising:

a sample rate converter, for converting sample values of a video signal digitized at a first predetermined clock frequency into video signal sample values at a second virtual sampling frequency;

a phase-locked loop for controlling the sample rate converter and which has a sync detector in order to determine the line sync pulse and set the virtual sampling frequency to an integer multiple of the line frequency of the video signal, and which has a burst detector in order to set or lock-in the virtual sampling frequency synchronously with the phase of the color subcarrier signal of the video signal; and a decoding-demodulating device for the recovery of the luminance and chrominance signal components from the video signal sample values at the virtual sampling frequency.

2. The digital decoder according to claim 1, whereby the sync detector of the phase-locked loop comprises;

a coarse sync detector for determining the line sync pulse of the video signal, in order to set the virtual sampling frequency to an integer multiple of the line frequency of the video signal; and a fine sync detector for determining an edge of the line sync pulse in order to set the phase of the virtual sampling frequency synchronously with the line frequency, whereby the burst detector determines the phase of the color subcarrier signal active during the burst pulse, in order to set the phase of the virtual sampling frequency synchronously with the phase of the color subcarrier frequency.

3. The digital decoder according to claim 2 wherein the phase-locked loop has a threshold and hysteresis means, which activates either the coarse sync detector or the fine sync detector or the burst detector and which gives different switching levels for a transition from a coarse phase control to a fine phase control to the lock-in than for a transition in a reverse direction.

4. The digital decoder according to claim 1 wherein the predetermined clock frequency is the operating clock frequency of a host system for the decoder.

5. The digital decoder according to claim 1 wherein the virtual sampling frequency is four times the color subcarrier frequency.

6. The digital decoder according to claim 5 further comprising a chroma gain control means, which evaluates the color information of the burst pulse and generates a signal indicating whether the virtual sampling frequency has a desired relationship with respect to the color subcarrier frequency.

7. A method for decoding video signals having a luminance signal component, chrominance signal component, color subcarrier signal, color subcarrier frequency, burst pulse, line frequency, and line sync pulse, comprising the steps of;

converting sample values of a video signal digitized at a first predetermined clock frequency into video signal sample values at a second virtual sampling frequency, determining the time position of the line sync pulse and producing the virtual sampling frequency in phase-locked manner as an integer multiple of the line frequency as a coarse phase control, determining the phase of the color subcarrier signal active during the burst pulse and setting or lock-in the phase of the virtual sampling frequency synchronously with the phase of the color subcarrier signal, producing the sample values at the virtual sampling frequency by interpolation from the sample values at the first predetermined clock frequency; and recovering the luminance component and the chrominance signal component of the video signal from the video signal sample values at the virtual sampling frequency.

8. The method according to claim 7, in that following the coarse phase control and prior to the synchronization of the virtual sampling frequency phase of the color subcarrier signal further comprising the step of:

determining an edge of the line sync pulse and setting the phase of the virtual sampling frequency synchronously with the line frequency as a fine phase control.

9. The method according to claim 8, further comprising the step of:

enabling the fine phase control when the coarse phase control has been completed and enabling the lock-in when the fine phase control has been completed.

10. The method according to claim 9, wherein a transition from the coarse phase control to the fine phase control, to the lock-in other switching levels, are provided for the transition in a reverse direction.

11. The method according to claim 7 wherein the first predetermined clock frequency is the operating clock frequency of a host system.

12. The method according to claim 7, further comprising the step of:

setting the virtual sampling frequency as an integer multiple of the line frequency corresponding to four times the color subcarrier frequency.

13. The method according to claim 7, further comprising the step of:

evaluating the chrominance information of the burst pulse;

determining, as a function of the evaluation, whether the virtual sampling frequency was produced with the correct relationship to the color subcarrier signal.

14. Method according to claims 7, wherein the virtual sampling frequency is set as 910 or 1135 times the line frequency of the video signal.

* * * * *